United States Patent
Ritter et al.

(10) Patent No.: US 6,168,871 B1
(45) Date of Patent: Jan. 2, 2001

(54) METHOD OF FORMING HIGH-TEMPERATURE COMPONENTS AND COMPONENTS FORMED THEREBY

(75) Inventors: Ann Melinda Ritter, Albany; Paul Leonard Dupree, Scotia; Melvin Robert Jackson, Niskayuna; Donald Norman Wemple, Jr., Schenectady, all of NY (US)

(73) Assignee: General Electric Company, Schenectady, NY (US)

( * ) Notice: Under 35 U.S.C. 154(b), the term of this patent shall be extended for 0 days.

(21) Appl. No.: 09/329,625

(22) Filed: Jun. 10, 1999

Related U.S. Application Data

(62) Division of application No. 09/035,802, filed on Mar. 6, 1998.

(51) Int. Cl.$^7$ .................................................. B22F 7/02
(52) U.S. Cl. ............................................. 428/548; 416/95
(58) Field of Search ............................... 428/548; 416/95

(56) References Cited

U.S. PATENT DOCUMENTS

| | | | |
|---|---|---|---|
| 3,647,316 | * | 3/1972 | Moskowitz ............................ 416/97 |
| 4,060,413 | * | 11/1977 | Mazzei et al. ...................... 75/208 R |
| 4,137,619 | * | 2/1979 | Beltran et al. .................. 29/156.8 H |
| 4,329,175 | * | 5/1982 | Turner . |
| 4,383,854 | * | 5/1983 | Dembowski et al. .................... 419/1 |
| 4,479,293 | * | 10/1984 | Miller et al. ..................... 29/156.8 R |
| 4,589,176 | * | 5/1986 | Rosman et al. ................... 29/156.8 B |
| 4,861,546 | * | 8/1989 | Friedman ................................ 419/8 |
| 5,130,084 | * | 7/1992 | Matheny et al. ........................ 419/8 |
| 5,304,039 | | 4/1994 | Corderman et al. ............. 416/241 R |
| 5,328,331 | * | 7/1994 | Bunker et al. ...................... 416/96 R |
| 5,340,530 | * | 8/1994 | Coulon ................................... 419/5 |
| 5,484,258 | * | 1/1996 | Isburgh et al. ....................... 415/115 |
| 5,498,133 | * | 3/1996 | Lee ..................................... 416/97 R |
| 5,626,462 | * | 5/1997 | Jackson et al. ..................... 416/97 R |
| 5,640,767 | * | 6/1997 | Jackson et al. ................. 29/889.721 |
| 5,820,337 | * | 10/1998 | Jackson et al. ...................... 415/200 |

OTHER PUBLICATIONS

Pending U.S. Patent Application Serial No. 08/905,628, filed Aug. 4, 1997, by Jackson et al., entitled "Graded Bond Coat for a Thermal Barrier Coating System".

* cited by examiner

Primary Examiner—Ngoclan Mai
(74) Attorney, Agent, or Firm—Ernest G. Cusick; Noreen C. Johnson

(57) ABSTRACT

A method for forming an exterior surface of a high-temperature component, such as a blade or vane of a gas turbine engine. The method entails forming a shell by a powder metallurgy technique that yields an airfoil whose composition can be readily tailored for the particular service conditions of the component. The method generally entails providing a pair of inner and outer mold members that form a cavity therebetween. One or more powders and any desired reinforcement material are then placed in the cavity and then consolidated at an elevated temperature and pressure in a non-oxidizing atmosphere. Thereafter, at least the outer mold member is removed to expose the consolidated powder structure. By appropriately shaping the mold members to tailor the shape of the cavity, the consolidated powder structure has the desired shape for the exterior shell of a component, such that subsequent processing of the component does not require substantially altering the configuration of the exterior shell. The airfoil can be produced as a free-standing article or produced directly on a mandrel that subsequently forms the interior structure of the component. In one embodiment, an airfoil is configured to have double walls through which cooling air flows.

4 Claims, 1 Drawing Sheet

METHOD OF FORMING HIGH-TEMPERATURE COMPONENTS AND COMPONENTS FORMED THEREBY

This application is a division of application Ser. No. 09/035,802, filed Mar. 6, 1998, which is hereby incorporated by reference in its entirety.

FIELD OF THE INVENTION

The present invention relates to methods for manufacturing components that must operate at high temperatures. More particularly, this invention relates to a process for forming superalloy components, such as blades and vanes of gas turbine engines, produced by a powder metallurgy technique and components formed thereby.

BACKGROUND OF THE INVENTION

Components of gas turbine engines, such as blades (buckets), vanes (nozzles) and combustors, are typically formed of nickel, cobalt or iron-base superalloys characterized by desirable mechanical properties at turbine operating temperatures. Because the efficiency of a gas turbine engine is dependent on its operating temperatures, there is a demand for components, and particularly turbine blades and vanes, that are capable of withstanding higher temperatures. As the material requirements for gas turbine engine components have increased, various processing methods and alloying constituents have been used to enhance the mechanical, physical and environmental properties of components formed from superalloys. For example, turbine blades and vanes are often cast to have single-crystal (SX) or directionally-solidified (DS) microstructures, characterized by a crystal orientation or growth direction in a selected direction, are typically employed for more demanding applications.

In general, advancements in such technologies have been such that the maximum local metal temperatures of components formed from these superalloys are approaching the alloy melting temperatures. Accordingly, in terms of high temperature capability, it is generally necessary that gas turbine engine components have internal cooling passages through which cooling air is routed to lower the surface temperature of the component. Typical cooling schemes include one or more interior cooling passages having possibly a circuitous route through the airfoil section, with bleed air being forced through the cooling passages and discharged through openings at the surface of the component in order to transfer heat from the component. Considerable cooling air is often required to sufficiently lower the surface temperature of a blade or vane. However, the casting process and the cores required to form the cooling passages limit the complexity of the cooling scheme that can be formed within a component, and therefore limits the rate at which heat can be transferred to the cooling air.

In view of the above, it would be advantageous if high-temperature components such as gas turbine engine blades and vanes could be produced to have a more efficient internal cooling scheme. One such approach has been to fabricate blades and vanes with double walls which form a plenum that is supplied by cooling air through multiple cooling channels. This type of cooling scheme enables a more uniform supply of cooling air near the surface of such components, which significantly reduces surface temperatures. Techniques for fabricating double-walled blades and vanes have included the use of brazed foils, low pressure plasma spraying (LPPS), and electron beam physical vapor deposition (EBPVD). However, each of these processes has disadvantages. For example, the brazed foil technique requires forming the exterior shell of a component from an alloy that can be readily worked to form a suitably thin foil. As a result, the types of alloys that can be used to form the foil are extremely limited. Plasma sprayed shells inherently have a relatively high oxygen content and must be densified to eliminate porosity. Furthermore, the plasma spray process is inefficient in the use of powders, since much of the sprayed powder misses the deposit surface. Finally, the EBPVD process cannot be sufficiently controlled to be practical for production.

Therefore, it would be desirable if an improved method were available for mass producing high-temperature components with more efficient internal cooling schemes that include a double-walled shell structure.

SUMMARY OF THE INVENTION

According to the present invention, there is provided a method for forming an exterior superalloy surface for a high-temperature component, such as a blade or vane of a gas turbine engine. The method entails forming an exterior shell of the component by a powder metallurgy technique that yields an airfoil whose composition can be readily tailored for the particular service conditions of the component. The shell can be produced as a free-standing article or produced directly on a mandrel that subsequently forms the interior structure of the component. By forming the shell in this manner, the component can be configured to have double walls that form a plenum supplied by cooling air, thereby increasing the temperature at which the component may operate by more efficiently and uniformly transferring heat from the component surface.

According to this invention, the method generally entails providing a pair of inner and outer mold members that form a cavity therebetween. A metallic powder is then placed in the cavity, and the powder consolidated within the cavity at an elevated temperature and pressure in a non-oxidizing atmosphere. Thereafter, at least the outer mold member is removed to expose the consolidated powder structure. By appropriately shaping the mold members, the consolidated powder can have the desired shape for the exterior shell of a component, such that subsequent processing of the component does not require substantially altering the configuration or shape of the exterior shell.

According to this invention, the inner mold member may be removed along with the outer mold member, such that the shell is a free-standing member that can be subsequently assembled with and secured to an interior structure of the component, such as a spar of a gas turbine engine blade or vane. Alternatively, an interior structure of the component can be used as the inner mold member, such that the shell is formed in situ during consolidation. To tailor the mechanical, physical and/or environmental properties of the shell, multiple powders having different compositions may be placed in the cavity between the inner and outer mold members. The powders may all be superalloy compositions, or one or more powders may be formulated to yield a composite region in the shell. For this purpose, powders may be used that contain fiber materials, wire materials, particulate materials, and compositions that react in situ to form fiber, wire and/or particulate materials.

In view of the above, it can be seen that forming the exterior shell of a high-temperature component in the manner described above allows the interior structure of the component to be more readily configured to have a complex cooling scheme, including a double-walled configuration that provides plenum cooling near the surface of the component. In this manner, the temperature of the component can be more readily reduced by more efficient heat transfer and/or the amount of cooling air flow through the component can be considerably reduced. Furthermore, the mechanical, physical and environmental properties of various regions of a component can be tailored by selectively using different powder compositions to form certain regions of the component shell. As a result, alloys, alloying constituents and compositions that promote certain mechanical, physical or environmental properties can be used in limited regions of the component where their effect will be most beneficial, which will often promote service life while also potentially lowering component weight and material costs.

Other objects and advantages of this invention will be better appreciated from the following detailed description.

DETAILED DESCRIPTION OF THE INVENTION

The present invention provides a method for producing components that must operate at elevated temperatures, and particularly components of gas turbine engines, such as blades (buckets) and vanes (nozzles). These components are typically formed from nickel, cobalt or iron-base superalloys whose compositions are specially formulated to withstand the hostile thermal and oxidation environment of a gas turbine engine. The method of this invention provides for the fabrication of an exterior surface region of such a component from one or more powders to yield a double-walled exterior structure that promotes surface cooling of the component. An additional benefit is that different powders can be selectively used whose compositions are tailored to obtain desirable mechanical, physical and environmental properties in certain regions of the component.

Figure 1:
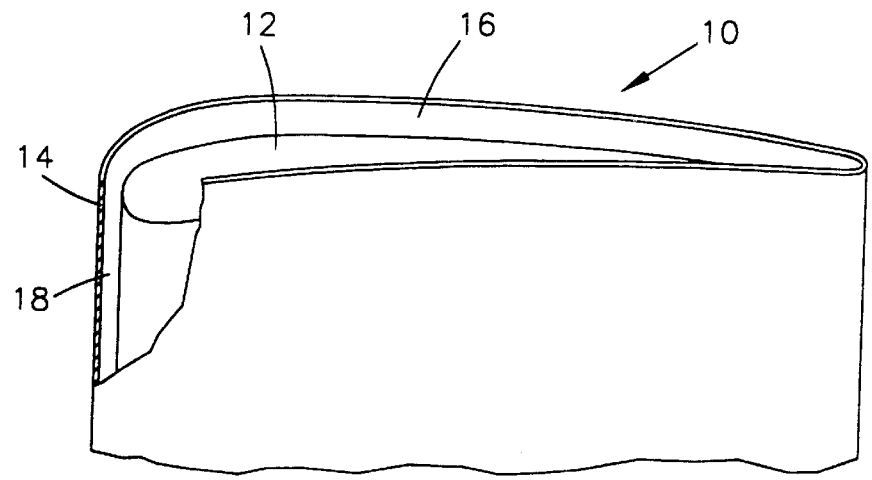
FIG. 1 is fragmentary perspective view in partial cross-section of an inner mandrel and outer jacket assembly used to produce an exterior shell of a gas turbine engine airfoil in accordance with this invention.

The method of this invention entails a powder metallurgy technique that is particularly suited to forming the airfoil shell of a superalloy blade or vane. FIG. 1 is a fragmentary view of a mold assembly 10 suitable for producing such an airfoil shell from one or more metallic powders. The assembly 10 generally includes two mold members, an inner mandrel 12 and an outer jacket 14. Preferred materials for the mandrel 12 and jacket 14 include iron-base alloys such as plain carbon steels, INVAR and KOVAR, though other materials could be used. It may be desirable to coat the surfaces of the mandrel 12 and jacket 14 in order to prevent diffusion of the powder. The material and thickness of such coatings will depend on the material being consolidated. As an example, nickel is preferably electroplated on the mold surfaces of the assembly 10 if the powder used is a nickel-base superalloy. As will be discussed below, the mandrel 12 may be formed of a non-fugitive superalloy and serve as the interior structure for the component being produced. Accordingly, while the mandrel 12 is shown in FIG. 1 as being solid with a smooth exterior surface, the mandrel 12 could be fabricated to have a wide variety of configurations.

When assembled as shown in FIG. 1, the mandrel 12 and jacket 14 are preferably uniformly spaced apart to form a cavity 18 therebetween. A suitable width for this cavity 18 is about 0.04 inch (about 1 millimeter), though it is foreseeable that greater or lesser widths could be used. The one or more powder compositions used to form the airfoil shell are placed in the cavity 18, evacuated, sealed and subsequently consolidated at an elevated temperature and pressure in a non-oxidizing atmosphere, i.e., hot isostatic pressing ("HIPing"). As shown, the jacket 14 is preferably longer than the mandrel 12, such that the jacket 14 forms a lip 16 that projects above the mandrel 12, allowing for the use of excess powder that will fill the cavity 18 during HIPing.

Figure 2:
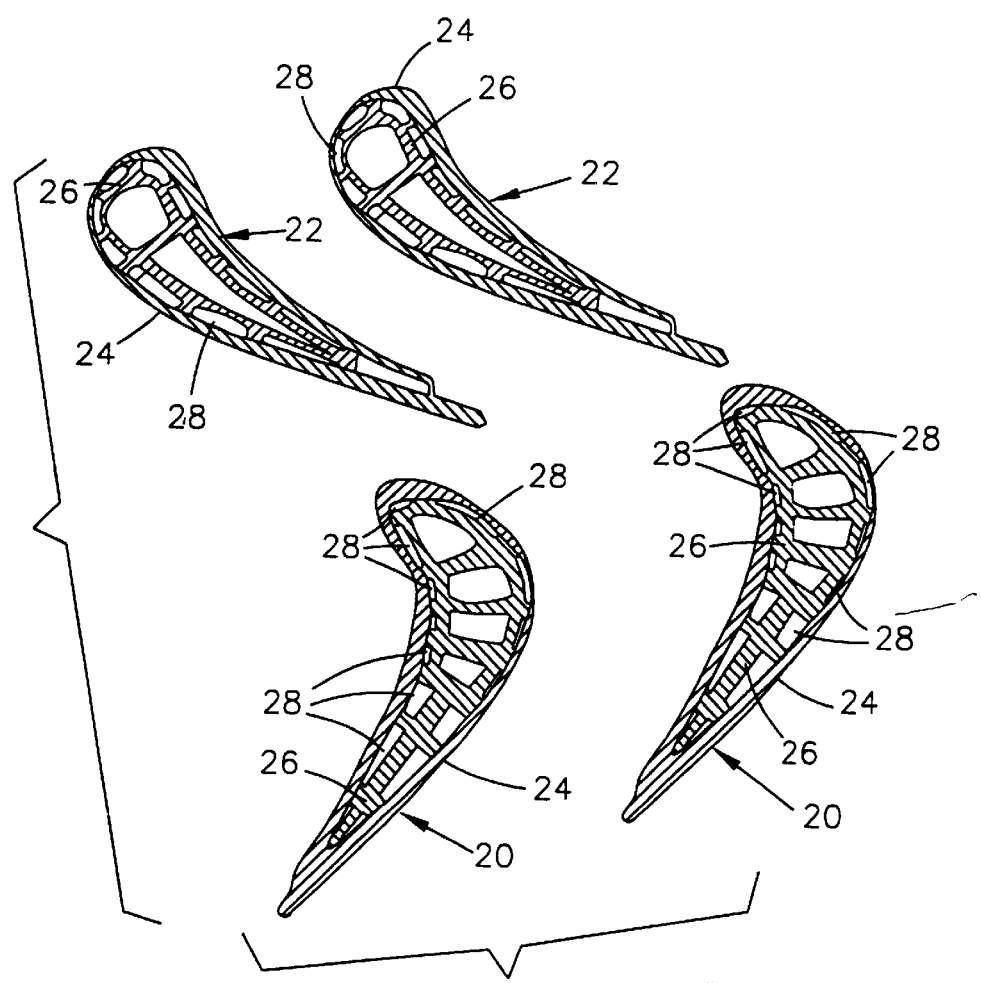
FIG. 2 shows a number of blades and vanes in cross-section, with exterior shells secured to spars in accordance with the method of this invention.

To promote powder flow into the cavity 18, a preferred size range for the powder or powders is about 270 to about 325 mesh (about 55 to 44 m). After filling the cavity 18, the assembly 10 is sealed under vacuum followed by HIPing in a vacuum or an inert atmosphere (e.g., argon gas) for a duration sufficient to consolidate the powders. Suitable HIPing conditions generally include pressures of at least about 15 ksi (about 100 MPa), with temperatures being chosen on the basis of the composition of the alloy powder, as would be understood by those skilled in the art. Following HIPing, either the outer jacket 14 alone or both the mandrel 12 and jacket 14 are removed by a combination of machining and chemical etching, the latter being preferably performed with a solution of nitric acid diluted in water at a ratio of about 50/50. If both the mandrel 12 and jacket 14 are removed, the process produces a free-standing airfoil shell that can be subsequently assembled and brazed, diffusion bonded, etc., to an inner structure (e.g., spar) of any desired composition and microstructure. This embodiment is represented in FIG. 2, which shows high pressure turbine blades 20 and vanes 22 having double-wall configurations. In particular, airfoil shells 24 produced in accordance with this invention are shown as being assembled with spars 26, defining plenums 28 through which cooling air is able to flow along the interior surfaces of the shells 24. More efficient heat transfer from the exterior surfaces (shells 24) of the blades 20 and vanes 22 is achieved as a result of the greater intimate contact between the shells 24 and the cooling air flowing through the plenums 28.

The embodiment in which the jacket 14 and not the mandrel 12 is removed entails forming the mandrel 12 as the interior structure of the blade 20 or vane 22. This embodiment also entails the use of fugitive inserts configured to form the plenums 28 and which are removed with the jacket 14. The mandrel 12 preferably has the cross-sectional configuration of that shown for the spars 26 in FIG. 2, with the fugitive inserts filling the regions corresponding to the plenums 28 such that the inner surface of the shell 24 is consolidated on the mandrel 12 (which subsequently serves as the spar 26) and the fugitive inserts.

Airfoil shells 24 formed by the above process are generally characterized by a thickness variation of about ±0.01 inch (about +0.25 mm), and a fine grain structure with a fairly homogeneous distribution of second phases, as would be expected with a powder metallurgy product. Suitable thicknesses for the shells 24 are about 0.02 to about 0.04 inch (about 0.5 to 1 millimeter) or less, though it is foreseeable that greater thicknesses could be used. If desired, the fine grain structure of a shell 24 can be modified by critical strain generation, such as by peening or a cold coining operation, plus a heat treatment to cause grain growth. Alternatively, the effects of the fine grain structure can be offset by the inclusion of composite materials in the powder used to form the shell, or a coarser grain structure can be obtained by the inclusion of one or more low-melting materials with remnant chemistries to eliminate the prior particle boundaries (PPBs) associated with powder metallurgy that otherwise obstruct grain growth.

During the course of evaluating this invention, airfoil shells were formed of various powder compositions. In one evaluation, nickel- and cobalt-base superalloy powders were consolidated using the assembly 10 shown in FIG. 1 by HIPing at about 2100 F (about 1150 C) for about four hours at 15 ksi (about 100 MPa) in a vacuum. In one region of the shell, a Ni—22Cr—10Al—0.8Y alloy powder was loaded around the entire circumference of the cavity 18. The remainder of the cavity 18 was filled with the same nickel-base powder for the leading edge of the airfoil shell, while a Co—32Ni—21Cr—8Al—0.5Y alloy powder was loaded to form the trailing edge of the airfoil. In this manner, the mechanical and environmental properties of different regions of the airfoil were tailored by appropriate selection of the alloy powders used. After HIPing, removal of the mandrel 12 and jacket 14 was by a combination of machining and etching, yielding a free-standing shell that was readily assemblable with a spar to form an airfoil.

Certain mechanical, physical and/or environmental properties of an airfoil can be further promoted by the inclusion of specific elements in one or more powders used to form an airfoil shell. For example, the selective use of powders having high concentrations of platinum, palladium, ruthenium, etc., can be employed to achieve an excellent balance of strength and environmental resistance throughout or in certain regions of an airfoil shell. Such a capability drastically reduces the amount of such elements used, since they are absent from the airfoil spar and limited to surface regions where their benefits are most beneficial. Another notable aspect of the invention is that detrimental elements such as sulfur can be more readily eliminated from the airfoil shell without the added processing costs that would be required to eliminate sulfur from the entire component.

As noted above, the method of this invention also lends itself to forming composite airfoil shells. For example, composite structures of fiber and/or wire-reinforced alloys can be formed by a similar powder metallurgy technique to form flat composite sheets or foils. The composite sheets are then inserted selectively or along the entire circumference of the cavity 18 of the assembly 10 shown in FIG. 1. Subsequent loading of the cavity 18 with an alloy powder yields a foil-fiber-foil cross-section through the shell wall. Various reinforcement materials can be used, such as single-crystal alumina and metal wires such as tungsten, molybdenum and oxide dispersion strengthened (ODS) alloys. For example, an airfoil shell having a wire-reinforced leading edge was produced with the assembly 10 shown in FIG. 1. The reinforcement material was in the form of two woven mats of alternating tungsten and FeCrAlY wires having diameters of about 0.005 inch (about 0.125 millimeter). The woven mats were separated by a single sheet of FeCrAlY foil having a thickness of about 0.002 inch (about 0.050 millimeter), and sandwiched between two Kanthal (FeCrCoAl) foils also having thicknesses of about 0.005 inch (about 0.125 millimeter). The reinforcement material was then placed in the leading edge region of the cavity 18 and attached to the mandrel 12, with the long axis of the wires being parallel to the leading edge of the airfoil. The remainder of the cavity 18 was filled with Fe—20Cr—4.5Al—0.5Y (in weight percent) powder having a powder size range of about −140 to about +270 mesh (about 53 to about 105 m). Thereafter, the cavity 18 was evacuated and welded, and then HIPed at about 1150 C for about four hours at about 15 ksi (about 100 MPa), resulting in full consolidation of the powder and foils.

Monocarbide reinforcement can also be achieved by the method of this invention, such as by processing carbon fibers in a nickel-base matrix with sufficient titanium, tantalum, niobium, vanadium, hafnium and/or zirconium for monocarbide formation to proceed during HIPing or subsequent heat treatment. In situ reactions to form monolithic or composite structures are also within the scope of this invention. For example, reactions using low-melting materials are possible, such as reacting aluminum or aluminum-silicon powders mixed with nickel-base or other powders to form monolithic or composite materials. Particulate reinforcement, such as alumina particles blended with nickel-base powders can be used to produce portions of the airfoil shell that have radically different physical properties such as modulus, expansion and thermal conductivity.

From the above, it can be seen that the present invention provides a practical method for producing high-temperature components with either uniform or selectively tailored properties. More broadly, the invention enables the production of structures that can be difficult to produce using conventional techniques, such as casting. In terms of blades and vanes for gas turbine engines, the invention provides a method for producing double-walled airfoils that considerably promotes heat transfer while also being practical for mass production. The method of this invention further promotes heat transfer rates by allowing for thinner wall sections with tolerances better than that possible by casting. Accordingly, more efficient cooling structures can be achieved with complex structures and wall dimensions that are beyond the castability range of superalloys and the capability of fragile ceramic cores used to cast superalloys. Reduced component weight is also a potential benefit of this invention due to the use of thinner wall sections. The process of this invention also makes possible the mass production of airfoil shells and/or spars having turbulation promoters within cooling air passages plenums that further promote heat transfer from a component to cooling air flowing therethrough.

While our invention has been described in terms of a preferred embodiment, it is apparent that other forms could be adopted by one skilled in the art. For example, the physical configuration of airfoil shells produced by the invention could vary considerably from that shown, and the compositions of the airfoil shells and the HIPing parameters could be modified from that noted. Therefore, the scope of our invention is to be limited only by the following claims.

What is claimed is:

1. A double-walled article comprising:

an outer wall member;

an inner wall member; and at least one plenum disposed between the inner member and the outer member to define a double-walled structure for the double-walled article;

the double-walled article further comprising a secondary material disposed in the double-walled article, the secondary material selected from the group consisting of fiber materials, wire materials, particulate materials, and compositions;

wherein the double-walled article is formed by the method comprising the steps of:

providing a cavity formed between inner and outer mold members;

placing a metallic powder in the cavity between the inner and outer mold members;

forming an exterior shell having a desired configuration for the double-walled article by consolidating the metallic powder within the cavity at an elevated temperature for heating and pressure in a non-oxidizing atmosphere;

removing at least the outer mold member to expose the exterior shell of the double-walled article; and securing the exterior shell to an interior structure of the double-walled article.

2. An article according to claim 1, wherein the powder materials comprise superalloy materials selected from the group consisting of nickel-, cobalt-, and iron-based superalloys.

3. A double-walled airfoil comprising:

an outer airfoil shell member;

an inner spar member; and at least one plenum disposed between the inner spar member and the outer airfoil member to define a double-walled structure for the double-walled airfoil;

the double-walled airfoil further comprising a secondary material disposed in the double-walled airfoil, the secondary material selected from the group consisting of fiber materials, wire materials, particulate materials, and compositions;

wherein the double-walled airfoil is formed by a method comprising the steps of:

providing a cavity formed between inner and outer mold members;

placing a metallic powder of a superalloy in the cavity between the inner and outer mold members;

forming a double-walled airfoil shell having a desired configuration for the double-walled airfoil by consolidating the metallic powder within the cavity at an elevated temperature and pressure in a vacuum;

removing at least the outer mold member to expose the double-walled airfoil shell of the article; and assembling the airfoil shell to an interior structure of the double-walled airfoil and then securing the airfoil shell to the interior structure so as to form a double-walled airfoil.

4. An airfoil according to claim 3, wherein the superalloy powder comprises a superalloy selected from the group consisting of nickel-, cobalt-, and iron-based superalloys.

* * * * *